(12) United States Patent
Borrego Bel et al.

(10) Patent No.: US 7,066,749 B2
(45) Date of Patent: Jun. 27, 2006

(54) METHOD AND SYSTEM FOR PREVENTING THE FORMATION OF AN ELECTRIC ARC IN A CONNECTOR WHICH IS INSERTED IN A POWER LOAD SUPPLY LINE

(75) Inventors: Carles Borrego Bel, Valls (ES);
Fernando Gallego Hugas, Valls (ES)

(73) Assignee: Lear Corporation, Southfield, MI (US)

( * ) Notice: Subject to any disclaimer, the term of this patent is extended or adjusted under 35 U.S.C. 154(b) by 219 days.

(21) Appl. No.: 10/709,689

(22) Filed: May 22, 2004

(65) Prior Publication Data

US 2004/0203271 A1    Oct. 14, 2004

(51) Int. Cl.
*H01R 13/55* (2006.01)

(52) U.S. Cl. ...................................... 439/181
(58) Field of Classification Search ................. 439/34, 439/188, 181, 88, 183–187; 361/2, 6, 13, 361/8; 307/126, 130, 85; 320/128
See application file for complete search history.

(56) References Cited

U.S. PATENT DOCUMENTS

| | | | |
|---|---|---|---|
| 4,025,820 A | 5/1977 | Penrod | 361/8 |
| 4,438,472 A | 3/1984 | Woodworth | 361/13 |
| 4,598,330 A | 7/1986 | Woodworth | 361/13 |
| 4,885,564 A * | 12/1989 | Vercellotti et al. | 340/310.06 |
| 5,633,540 A * | 5/1997 | Moan | 307/126 |
| 5,637,980 A | 6/1997 | Wu | 320/128 |
| 5,867,356 A * | 2/1999 | Duggal et al. | 361/13 |
| 6,522,034 B1 * | 2/2003 | Nakayama | 307/130 |
| 6,624,989 B1 * | 9/2003 | Brooks, Jr. | 361/6 |
| 6,741,435 B1 * | 5/2004 | Cleveland | 361/2 |
| 6,746,250 B1 * | 6/2004 | Blutbacher | 439/34 |
| 6,746,258 B1 * | 6/2004 | Kikuchi et al. | 439/181 |
| 6,793,510 B1 * | 9/2004 | Yamakawa et al. | 439/188 |

* cited by examiner

*Primary Examiner*—Alexander Gilman
(74) *Attorney, Agent, or Firm*—Bruce E Harang

(57) ABSTRACT

The connector (11) is made up of electroinsulator supports (1, 2) carriers of at least one pair of terminals (3, 4) capable of coupling to a plug said terminals (3, 4), being in a coupling position for said electroinsulator supports (1, 2), electrically joined to each other establishing a channel (5) for the passing of electrical energy towards said power load (10), the method and system being made up of a connection (15) between a point (23) of said channel (5) near to the load (10) and after the connector (11), whose connection passes through the connector (11), in order to detect a voltage (V2) and/or intensity in the second point (23), which is compared with the voltage (V1) of supply, and in the event of a sudden change being observed, said supply is cut off.

9 Claims, 2 Drawing Sheets

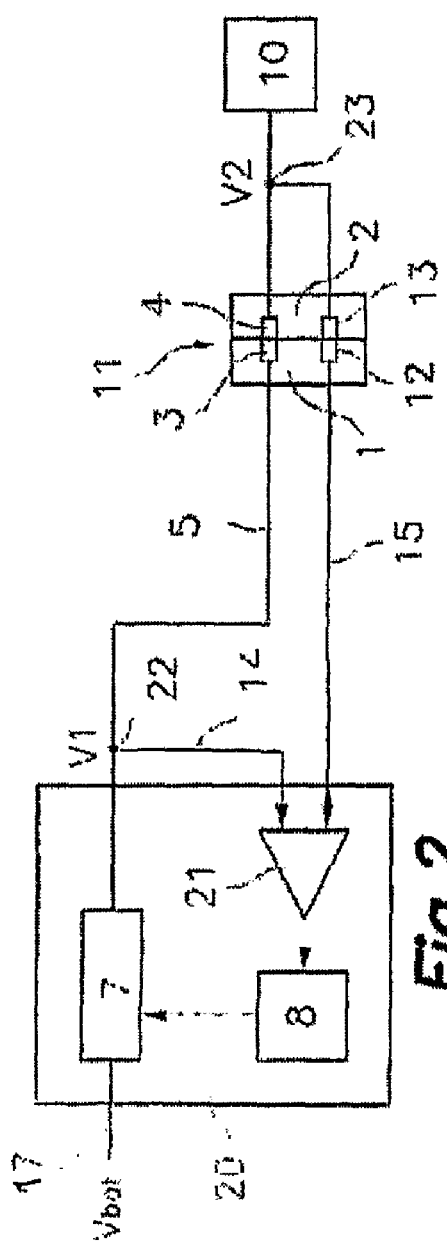
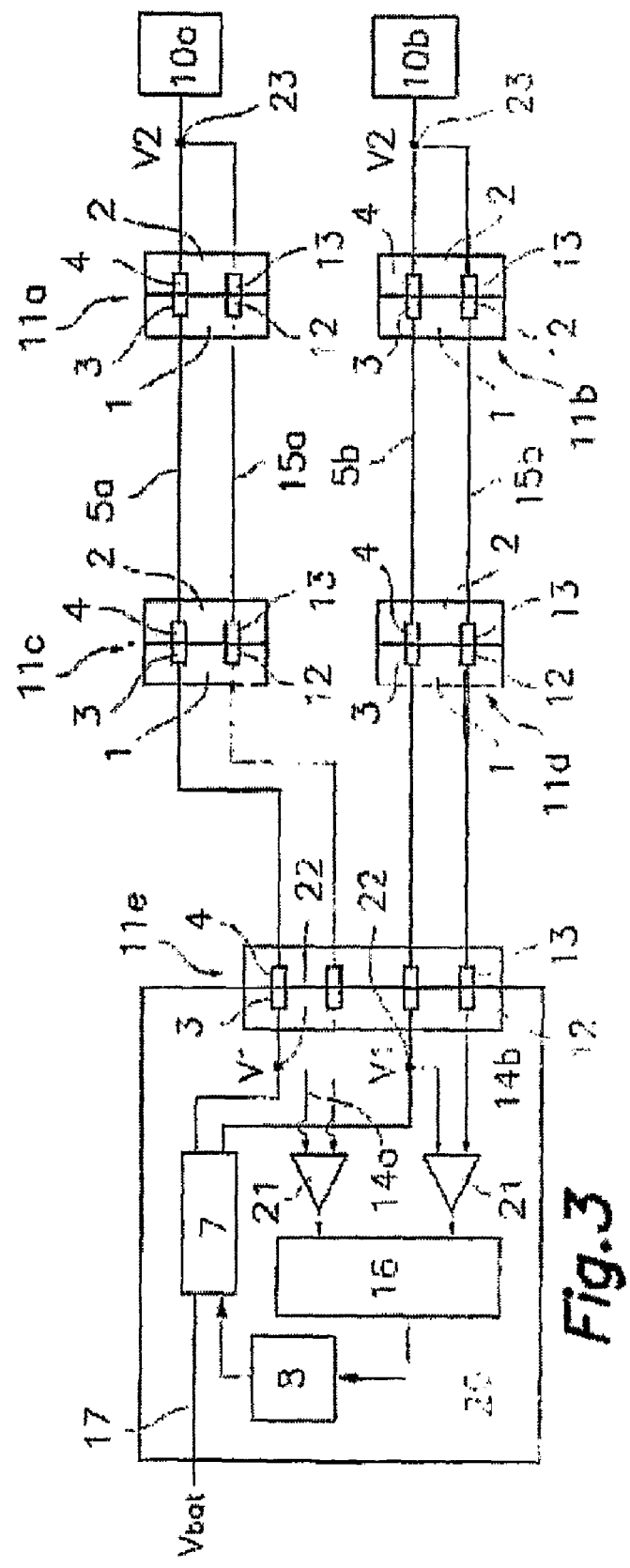

METHOD AND SYSTEM FOR PREVENTING THE FORMATION OF AN ELECTRIC ARC IN A CONNECTOR WHICH IS INSERTED IN A POWER LOAD SUPPLY LINE

BACKGROUND OF INVENTION

1. Field of the Invention

This invention concerns a method and system to prevent the formation of an electrical arc on a connector inserted into a supply line of a power load, particularly applicable to a network installed in an automobile to supply power loads, such as a 42V network in a vehicle with two voltage levels (14V and 42V, or "dual voltage" system) with the aim of preventing, when the connector components become separated either accidentally or due to a lack of warning from a manipulator, an electric arc from being generated between contact points which causes the premature destruction or deterioration of these contacts, or of the connector itself, an untimely interruption in the supply to certain loads of the network or a fire situation with damage of varying degrees of seriousness, particularly during the disconnection of the two components or electroinsulator support components of a connector carrying the contact electroconductive terminals.

The invention is also of special interest for electrical vehicles in which a group of batteries is used to provide energy for an electrical engine used to propel the vehicle and where the current levels are in the order of 400 A to 400 V, for C.C., and from 40 A to 220 V for C.A., whose current and voltage levels require the incorporation of a series of safety measures to minimize the risk of injury for the users, mechanics and safety technicians.

2. Background of the Invention

The gradual implementation of the supply system on two different voltage levels in an automobile means that one part of the network, particularly that used to supply power loads, is supplied at a new voltage level, for example 42V, much higher than the voltage of approximately 14V commonly used in automobiles up to now. It is obvious that the supply of loads at this new higher voltage level provides some clear advantages. However, it also has the disadvantage of being high enough to generate electrical arcs, particularly when connectors in lines that supply loads at this high voltage are disconnected.

Also in electrical traction vehicles, whose gradual implementation is foreseeable, supply currents at high levels are used which are liable to generate electrical arcs.

There are numerous documents dealing with the problem of the formation of an electrical arc, both when connecting and, particularly disconnecting the two parts that make up a connector inserted into a load supply network at a voltage level liable to generate these electrical arcs.

In EP-A-697751, EP-A-673085 and U.S. Pat. No. 6,146,160 connectors are described with the means for an efficient mechanical subjection of the connection terminals, normally electroconductive bolts and eyebolts, so that accidental disconnection cannot occur.

In U.S. Pat. No. 3,945,699, U.S. Pat. No. 4,749,357 and U.S. Pat. No. 5,676,571, the means linked to the receiving nut of electroconductive bolts are described, intended to obstruct or minimise the formation of electrical arcs when connecting the two components of a connector.

U.S. Pat. No. 6,225,153 describes a universal load gate connector for electrical vehicles, where a mechanism is provided to cut the current liable to generate an arc during disconnection of the male and female terminals of the connector before the uncoupling of the two component parts of the connector, in particular to prevent the disconnection of the connectors during the charging of the vehicle batteries, whose mechanism includes a mechanical lock of these two parts activated by a trigger which is linked to a switch connected to a power source for the whole of the connector. Through this switch, and on the trigger being activated by a user, the current circulation towards the power load to be supplied is disabled before the disconnection of the male-female terminal or power terminals of the connector is enabled.

U.S. Pat. No. 5,542,425 describes an instrument and method for preventing the deterioration of contacts in electrical equipment, specifically in equipment for acquisition of images with an ultrasound system in which several probes can be connected to the acquisition system without the risk that when disconnecting these probes an electrical arc will be given off, in whose system the connector includes a part activated mechanically to activate and deactivate a connection interface between the components, including a sensor or detector which determines when the connector is going to be disconnected by one of the components and provides a signal which is used by one of the components to disable the electrical energy supply towards the connector and thus prevents the formation of an electrical arc when the male-female terminals of the same separate physically. In the different examples that this patent illustrates the aforementioned part is a gyrating shaft on which the user must act and the aforementioned sensor is an optical sensor, magnetic sensor or a simple switch.

In the last two cases, the disconnection of the supply source is carried out either by the user himself (as in U.S. Pat. No. 6,225,153) or through the addition of a sensor linked to a mechanism also activated by the user (as in U.S. Pat. No. 5,542,425), the connector always being required to act with the means to appropriately displace its contacts, generation of delays by the operating mechanical conditions being essential for its adequate operation.

One objective of this invention is to provide a method for preventing the formation of an electrical arc in a connector inserted in a supply line of a power load making use of specific characteristics of the falls in voltage and evolution of the intensity which occur when a disconnection of the supply to a power load is carried out in order to detect the moment of disconnection and cut the supply of electrical fluid to this load before an electrical arc can occur.

Another objective of this invention is to provide a system to implement a method with the characteristics described in the previous paragraph with a low cost and based on components currently in use, particularly in the automobile industry.

BRIEF DESCRIPTIONS OF THE INVENTION

The method and system of this invention are planned to prevent the formation of electrical arcs in connectors inserted in lines that supply power loads through the detection of a difference of voltage between a first voltage or supply voltage from an electrical energy supply source and a second voltage taken at a point close to the load. Electronic means detect and continually compare these two voltage values and, in the event that within a minimum, predetermined time interval, the difference detected between the first and second voltages is greater than a predetermined threshold, electrical means immediately cut the supply of electrical energy towards that channel which supplies the power load affected by the disconnection of the connector. Simultaneously or alternatively, the comparison may be made on first and second values of intensity taken respectively at the same points as the voltages.

The connector inserted into the line that supplies the load is made up of first and second carrier electroinsulator supports of a first pair of terminals connected to both portions of said power line. Advantageously, to make the detection of the voltage or intensity in the above mentioned point near to the load, the method of this invention uses a connection which passes through a second pair of terminals situated in the first and second electroinsulator supports of the same connector. This second pair of terminals is ordinary, and may be the same as the first pair. That is to say, the implementation of the method proposed does not require the employment of modified or specifically designed connectors.

As is explained below, the aforementioned difference detected between the first and second voltages or intensities, above a predetermined threshold, is indicative of a sudden cut in the aforementioned channel for the passing of electrical energy towards the load or on the detection channel, typically due to the disconnection of a connector.

Based on the study of voltage and intensity graphs against time relating to a portion of the circuit which has been disconnected from the load, and during the moments following the disconnection, an initial sudden fall in the voltage is observed which then drops gradually during a certain period of time, during which an electrical arc is liable to occur, before eventually falling to zero, while the intensity experiences a sudden negative peak at the moment of the disconnection that is recovered immediately to gradually descend during a certain period of time, which is the same during which the electrical arc is liable to occur, before eventually falling to zero.

Electronic means are in place to continually detect and compare pairs of voltage and/or intensity values and, in the event of the above mentioned initial sudden fall in voltage and/or the above mentioned negative intensity peak being detected, these electronic means cut the supply of electrical energy towards the load involved in a sufficiently short time to prevent the formation of the electrical arc in the connector. When one network supplies several loads, with each load having its own connector, the electronics include an identification circuit to establish which of the connectors has been disconnected and to generate a priority interruption to a microprocessor which acts on a protection device by disconnection of the load involved without interrupting the supply of the remaining loads.

BRIEF DESCRIPTION OF DRAWINGS

For a better understanding of the invention, this will be described with the help of the pages of drawings on which examples of possible implementation are shown, for illustration purposes only, according to the following details:

FIG. 2 is an outline of this invention in accordance with its simplest implementation; and FIG. 3 is an outline of this invention in accordance with its most complete implementation;

DETAILED DESCRIPTION

Figure 1:
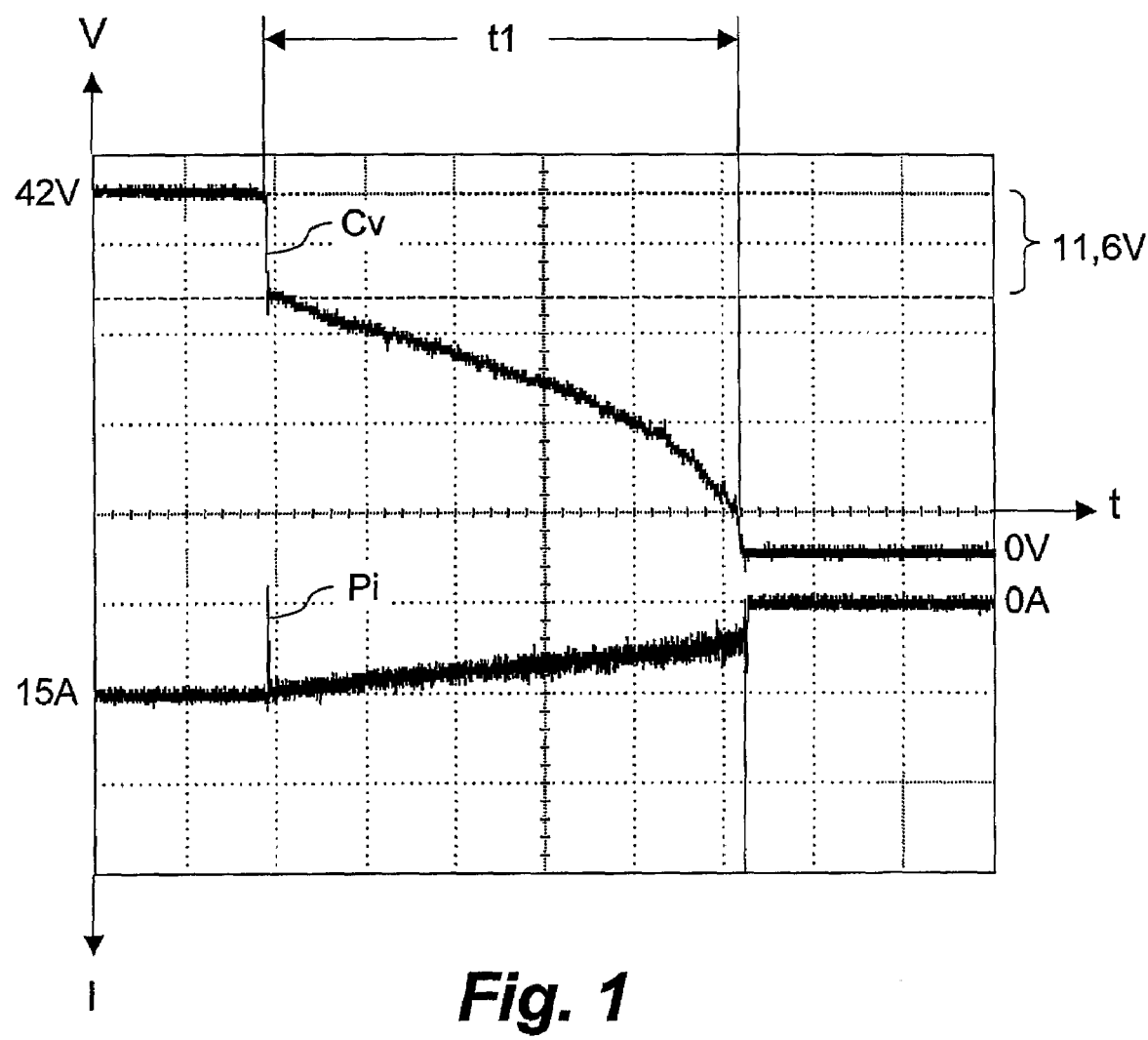
FIG. 1 is a diagram which shows the voltage and intensity against time in a connector for a few moments immediately after disconnection.

FIG. 1 shows a graph of voltage V and intensity I against time t. The graph relates to a line of supply to a load when disconnected and in the moments following the disconnection. The curve of the upper half relates to voltage V while the line of the lower half relates to intensity I. In the example shown, the initial voltage, on the left of the graph is 42V and the initial intensity is 15 A. On the right of the graph, both the voltage and the intensity have fallen to zero. In the central part of the graph a relatively broad area can be observed of duration t1 in which both the voltage curve and the intensity curve gradually descend towards the right, that is to say, towards their respective values 0V and 0 A. In this area of descent, the intensity and the voltage are still sufficiently high to cause an electrical arc, which has harmful effects for the useful life of the contacts and has a risk of fire.

It has been shown that at the moment of disconnection, and in this example for resistive loads, the voltage experiences a sudden fall Cv from the initial supply value, that is to say, 42V in the example shown, until an initial ramp value, whose fall Cv is, in this case, approximately 11.6V. This fall Cv of voltage relates, for example, to the moment of a physical disconnection of a connector and can easily be detected by the adequate electronic means. At the same time as the voltage experiences the sudden fall Cv, the intensity experiences a sudden negative peak Pi which is immediately recovered to slowly descend for the same time t1 of ramp descent of the voltage, and during which the electrical arc is liable to occur. The intensity eventually falls to zero at approximately the same time as the voltage. The above mentioned negative intensity peak Pi can also be detected by the adequate electronic means.

The method of this invention is based on the detection of the above mentioned fall of voltage Cv and/or the intensity peak Pi at the moment of the disconnection of a connector. By virtue of this detection, the electronic means carry out a cut in the electrical energy towards the load involved in a sufficiently short time to prevent the formation of the electrical arc.

With reference to FIG. 2 a first example of the system for the implementation of the method described above is described in accordance with this invention. In the Figure a connector 11 inserted into a line 5 of supply to a charge 10 of power is shown. The above mentioned connector is of a conventional type and is made up of first and second electroinsulator supports 1, 2 carriers of first and second pairs of terminals 3,4 and 12, 13 capable of freely coupling to a socket. In a coupling position for said electroinsulator supports 1,2, the above mentioned first and second terminals 3,4 and 12, 13 join electrically to each other, with the ones establishing the aforementioned channel 5 for the passing of electrical energy towards said power load 10. In an uncoupling position (not shown) of the electroinsulator supports 1,2, the first and second terminals 3,4 and 12, 13 physically separate, with the first ones interrupting the supply channel 5 to load 10. Just as has been noted above, the voltage and intensity in line 5 are such that the above mentioned physical separation of the pair ofterninals 3,4 can generate an electrical arc between them. Channel 5 generally forms part of a network of supply and distribution of electrical energy, for example in an automobile. This network, as is ususal, includes primary means of detection linked to an electrical unit 20 to continuously detect a first voltage V1 (and/or intensity) of supply of said network at a first point 22 situated on said channel 5, before the connector 11. The aforementioned primary means of detection are made up of a first connection 14 between the aforementioned first point 22 and an electronic comparative device 21.

To put into practice the method of the invention a secondary means of detection is provided linked to said electronic unit 20 to detect a second voltage V2 (and/or intensity) at a second point 23 situated on said channel 5 near to the power load 10 and after the connector 11. This secondary means of detection is made up of a second connection 15 between the aforementioned second point 23 and the aforementioned electronic comparative device 21. The aforementioned connection for supervision of the fall in voltage is established through a channel which goes through connector 11 through terminals 12, 13. If at the moment of the disconnection these terminals 12, 13 were those which were separated in the first place instead of terminals 3, 4, the difference in voltage or the jump detected would be much greater, given that line 15 is not a supply line but only a detection line.

The electronic comparative device 21 proceeds to continually compare said first and second voltages V1 and V2 (and/or first and second intensities). In the event that within a predetermined minimum time interval, a difference between the first and second voltages V1 and V2 (and/or first and second intensities) greater than the predetermined threshold has been detected, the comparative device 21 generates a priority interruption to a microprocessor 8 in order which acts on a protection device by disconnection 7, which carries out a cut in the supply of electrical energy to the aforementioned channel 5 towards the power load 10 through connector 11. This cut to the supply is made in a sufficiently short time to prevent the formation of an electrical arc in the connector 11.

The aforementioned predetermined threshold for said difference between the first and second voltages V1 and V2 (and/or first and second intensities) is selected to cover the fall in voltage Cv (and/or the negative intensity peak Pi) described in connection with the graph in FIG. 1, and which is indicative of a sudden interruption in the aforementioned channel 5 for the passing of energy or in said second connection 15 of the secondary means of detection.

Referring now to FIG. 2, the method in accordance with this invention is expected to be implemented in a network of supply and distribution of electrical energy which includes several of said loads 10a, 10b supplied through respective channels 5a, 5b for the passing of electrical energy. Although in FIG. 2 only two of said loads 10a, 10b have been illustrated, it is obvious that their number may be higher. Each of said channels 5a, 5b has at least one connector 11a, 11b inserted between electronic means 20 for the control of the supply and that relating to load 10a, 10b. In the example shown in FIG. 2, on each line 5 there are two of said connectors 11a 11c.

As in the previous example, and according to the system of this invention, for each line 5a, 5b there are primary and secondary means of detection formed by the first and second connections 14a, 14b, 15a, 15b between the first and second points 22, 23 and one corresponding comparative device 21 to detect and continually compare first and second voltages V1, V2 (and/or first and second intensities) relating to the output supply at point 22 and the input current to the load 10a, 1b at point 23 near to the same. A connector 11e, common to the supply lines 5a, 5b and for the second connections of detection 15a, 15b has been prepared at the input for the electronic means 20.

The different comparative devices 21 are connected to an identification circuit 16 linked to electronic unit 20, whose identification circuit 16 is responsible for differentiating the line or lines 5a, 5b for which the result of the comparison between the voltage or intensity values in the first and second points 22 and 23 is greater than said predetermined threshold. It will be observed that, with this device, a disconnection of any of the connectors 11a 11d, and even the common connector 11e, will result in the detection of the fall in voltage Cv or negative intensity peak Pi (see FIG. 1) in the channel or channels 5a, 5b involved.

In this case, the identification circuit 16 is the one which generates a priority interruption to a microprocessor 8 which acts on a protection device by disconnection 7 which carries out a cut in the supply of electrical energy to the aforementioned differentiated channel 5a, 5b, without interrupting the supply of the remaining channels.

It is important to point out that the system for the implementation of the method of this invention uses components that are conventional and of a type currently used in the automobile industry. Thus for example, the second pair of terminals 12, 13 linked respectively to said first and second electroinsulator supports 1 and 2 of each connector 11 11e to establish, when the corresponding connector 11 11e is in said coupling position, the aforementioned second connection 15, 15a, 15b between said second point 23 and the electronic comparative device 21.

Multiple variations and/or modifications may be considered by an expert in the subject without going beyond the scope of this invention as is defined in the following claims.

The invention claimed is:

1. Method to prevent the formation of electrical arcs in a connector inserted into a line of supply of a power load, said connector (11) being of the type that is made up of first and second electroinsulator supports (1,2) carriers of at least one pair of terminals (3,4) capable of freely coupling to a plug, said terminals (3,4), being in a coupling position for said electroinsulator supports (1,2), joined electrically between themselves establishing a channel (5) for the passing of energy towards said power load (10) and, in a coupling position forth electroinsulator supports (1,2), the terminals (3,4) separate physically interrupting said channel (5), said connector being inserted into a network of supply and distribution of electrical energy in which there are primary means of detection linked to an electronic unit (20) to continually detect a first voltage (V1) of supply of said network at a first point (22) situated on said channel (5) before the connector (11), the level of the aforementioned voltage being such that the aforementioned physical separation of the pair of terminals (3,4) may generate an electrical arc, characterized by including the steps for:

a) detecting, by means of the secondary means of detection linked to said electronic unit (20), a second voltage (V2) at a second point (23) situated on said channel (5) near to the power load (10) and after the connector (11);

b) comparing said first and second voltages (V1 and V2) by means of an electronic comparative device (21) and; in the event that within a predetermined minimum time interval, a difference detected between the first and second voltages (V1 and V2) is greater than the predetermined threshold indicative of a sudden interruption in the aforementioned channel (5) for the passing of electrical energy or in said secondary means of detection;

c) cutting, by means of a protection device by disconnection (7) linked to the electronic unit (20), the supply of electrical energy to the aforementioned channel (5) towards the power load (10) through the connector (11) for a time period sufficient to prevent the formation of an electrical arc;

characterized by said network of supply and distribution of electrical energy including several of said loads (10a, 10b) supplied through respective channels (5a, 5b) for the passing of electrical energy, at least one of said connectors (11a, 11b) being inserted into each one of said channels (5a, 5b) between the aforementioned first and second points (22,23), said method made up of:

simultaneously carrying out the aforementioned steps a) and b) for each of the several channels (5a, 5b);

differentiating, by means of an identification circuit (16) linked to the electronic unit (20), the connector or connectors (11a, 11b) for which the result of the comparison of step b) is greater than said predetermined threshold; and carrying out step c) for the channel or channels (5a, 5b) differentiated.

2. Method, in accordance with claim 1, characterized by consisting of generating, from said identification circuit (16), a priority interruption to a microprocessor (8) which acts on the protection device by disconnection (7) in order to carry out the aforementioned cut in the supply of electrical energy to the aforementioned differentiated channel (5a, 5b).

3. Method, in accordance with claim 1, characterized by being made up of establishing, for each channel (5, 5a, 5b) for the passing of electrical energy towards a load (10, 10a, 10b), a first connection (14, 14a, 14b) between the aforementioned first point (22) and said electronic comparative device (21), based on said primary means of detection, and a second connection (15, 15a, 15b) between the aforementioned second point (23) near to the power load (10, 10a, 10b) and the electronic comparative device (21), based on said secondary means of detection.

4. Method, in accordance with claim 3, characterized by consisting of generating, from said identification circuit (16), a priority interruption to a microprocessor (8) which acts on the protection device by disconnection (7) in order to carry out the aforementioned cut in the supply of electrical energy to the aforementioned differentiated channel (5a, 5b).

5. Method, in accordance with claim 3, characterized by consisting of using a second pair of terminals (12, 13) linked respectively to said first and second electroinsulatorsupports (1 and 2) of each connector (11, 11a, 11b) to establish, when the connector (11, 11a, 11b) is in said coupling position, the aforementioned second connection (15, 15a, 15b) between said second point (23) and the electronic comparative device (21).

6. Method, in accordance with claim 5, characterized by consisting of generating, from said identification circuit (16), a priority interruption to a microprocessor (8) which acts on the protection device by disconnection (7) in order to carry out the aforementioned cut in the supply of electrical energy to the aforementioned differentiated channel (5a, 5b).

7. System to prevent the formation of electrical arcs in a connector inserted into a supply line of a power load, said connector (11) being of the type that is made up of first and second electroinsulator supports (1,2) carriers of at least one pair of terminals (3,4) capable of freely coupling to the plug, said terminals (3,4), being in a coupling position for said electroinsulatorsupports (1,2), joined electrically between themselves establishing a channel (5) for the passing of electricity towards said power load (10) and, in a uncoupling position for the electroinsulator supports (1,2), the terminals (3,4) separate physically interrupting said channel (5), said connector being inserted in a network of supply and distribution of electrical energy in which there is a first connection (14) between a first point (22) situated in said channel (5) before the connector (11) and an electronic unit (20) to continually detect a first voltage (V1) and/or intensity of supply of said network; the aforementioned voltage and/or intensity being such that the aforementioned physical separation of the pair of terminals (3,4) may generate an electrical arc, characterized by consisting of a second connection (15) between a second point (23) situated in said channel (5) near to the power load (10) and after the connector (11) and said electronic unit (20) to detect a second voltage (V2) and/or intensity at said second point (23), an electronic comparative device (21) being planned in the electronic unit (20) to compare said first and second voltages (V1 and V2) and/or intensities, a microprocessor (8) to process the result of said comparison and a protection device by disconnection (7) able to cut, at the request of the microprocessor (8), the supply of electrical energy to the aforementioned channel (5) in the event that the result of said comparison, in a predetermined minimum time interval, of a difference between the first and second voltages (V1 and V2) and/or intensities greater than a predetermined threshold for a time period sufficient to prevent the formation of an electrical arc, further characterized by said network of supply and distribution of electrical energy including several of said loads (10a, 10b) supplied through respective channels (5a, 5b) for the passing of electrical energy, each one with said first and second detection connections (14, 15) and comparative device (21), at least one of said connectors (11a, 11b) being inserted into each one of said channels (5a, 5b) between the first and second points (22,23), an identification circuit (16) being ready, associated to the electronic unit (20) to differentiate the line or lines (5a, 5b) for which the result of the comparison is greater than said predetermined threshold and generates a priority interruption to the microprocessor (8) which acts on the protection device by disconnection (7) to can out the aforementioned cut in the supply of electrical energy to the channel (5a, 5b) involved for a time period sufficient to prevent the formation of an electrical arc.

8. Method, in accordance with claim 1, characterized because, simultaneously or alternatively, it also made up of detecting first and second intensity values in said first and second points (22 and 23), respectively, and carrying out step c) in the event that within a predetermined minimum time interval, a difference detected between said first and second intensity values is greater than a predetermined threshold.

9. System, in accordance with claim 7, characterized by consisting of using a second pair of terminals (12, 13) associated respectively to said first and second electroinsulator supports (1 and 2) of each connector (11, 11a, 11b) to establish, when the connector (11, 11a, 11b) is in said coupling position, the aforementioned second connection (15, 15a, 15b) between said second point (23) and the electronic comparative device (21).

* * * * *